United States Patent [19]
Maegawa

[11] Patent Number: 5,686,967
[45] Date of Patent: Nov. 11, 1997

[54] INFORMATION SIGNAL EDITING APPARATUS AND EDITING SYSTEM

[75] Inventor: Hirotoshi Maegawa, Kanagawa, Japan

[73] Assignee: Sony Corporation, Tokyo, Japan

[21] Appl. No.: 500,700

[22] Filed: Jul. 11, 1995

[30] Foreign Application Priority Data

Jul. 15, 1994 [JP] Japan ................................. 6-162598

[51] Int. Cl.⁶ ........................................... H04N 5/04
[52] U.S. Cl. ........................... 348/512; 348/516; 386/62
[58] Field of Search ...................... 348/17.14, 469, 348/495, 500, 515, 516, 518, 552, 722, 510, 512, 513; 358/405, 406, 409, 411, 311; 360/13, 14.1, 14.2, 14.3; 395/200.04, 200.19, 154; 370/100.1; 386/52, 61, 62; H04N 5/12, 9/475

[56] References Cited

U.S. PATENT DOCUMENTS

| | | | |
|---|---|---|---|
| 4,703,355 | 10/1987 | Cooper | 348/518 |
| 5,087,980 | 2/1992 | Staffer | 360/14.3 |
| 5,182,677 | 1/1993 | Kizu et al. | 360/14.2 |
| 5,262,965 | 11/1993 | Putnam et al. | 348/552 |
| 5,523,795 | 6/1996 | Ueda | 348/515 |

OTHER PUBLICATIONS

Tse-yun Feng, "A Survey of Interconnection Networks", Dec. 1981, pp. 12-27.

*Primary Examiner*—John K. Peng
*Assistant Examiner*—Jeffrey S. Murrell
*Attorney, Agent, or Firm*—Limbach & Limbach L.L.P.

[57] ABSTRACT

An information signal editing system comprises a plurality of information signal editing apparatuses and a network for interconnecting the plurality of information signal editing apparatuses and providing a bidirectional communication capability to transfer information signals between the editing apparatuses. Each editing apparatus edits at least one of a plurality of information signals entered asynchronously, the information signals containing synchronization information. Each editing apparatus is composed of a synchronization information detecting section and an editing section. The synchronization information detecting section detects the synchronization information from the entered information signals. The editing section performs editing processing on at least one of the entered information signals based on the synchronization information detected by the synchronization information detecting section.

12 Claims, 9 Drawing Sheets

INFORMATION SIGNAL EDITING APPARATUS AND EDITING SYSTEM

BACKGROUND OF THE INVENTION

1. Field of the Invention

The present invention relates to an information signal editing apparatus and an information signal editing system. More particularly, the present invention relates to an apparatus and a system for editing an information signal entered in an asynchronous state.

2. Description of Related Art

Editing schemes and editing apparatuses for video and audio signals are conventionally in a wide use in broadcasting stations and video editing studios to generate one image or sound from a variety of image sources and sound sources.

Figure 1:
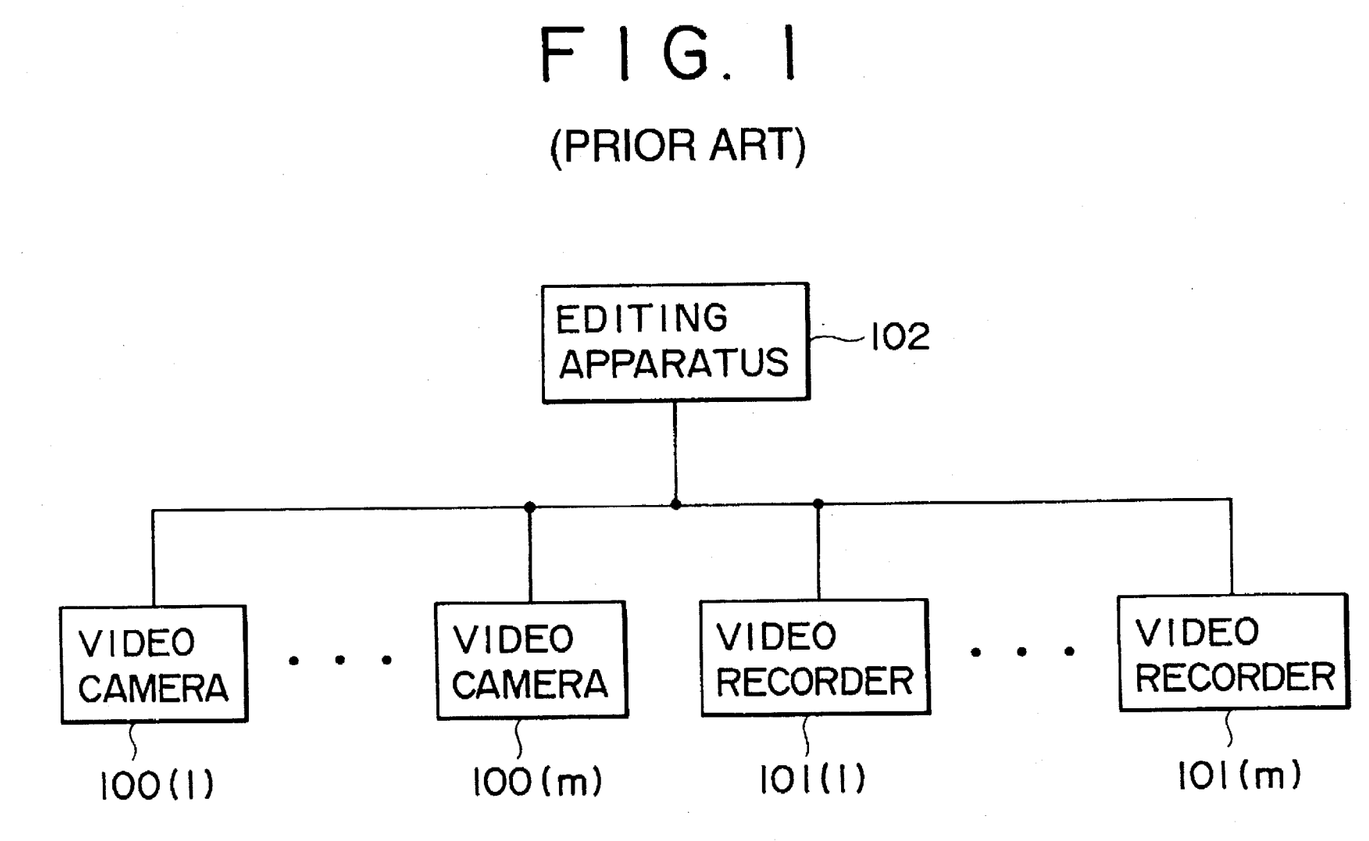
FIG. 1 is a diagram illustrating an example of the constitution of the conventional editing system.

In the conventional video editing apparatus, a plurality of video cameras 100 (1) through 100 (m) and a plurality of video recorders 101 (1) through 101 (m) are collectively managed and controlled by an editing apparatus 102 as shown in FIG. 1. In such a video editing apparatus, video signals supplied from the plurality of video cameras 100 (1) through 100 (m) and the plurality of video recorders 101 (1) through 101 (m) are edited by the editing apparatus 102 to form a new video signal. The created video signal 103 is newly recorded on the video recorder or outputted from a broadcasting apparatus as a broadcast image.

In such a video editing apparatus as the one mentioned above, an information communication system is constructed within a certain range in which synchronous control extends as exemplified by a private network. The operations of the video cameras 100 (1) through 100 (m) and the video recorders 101 (1) through (m) are all controlled by the editing apparatus 102, which selects and determines which of the video sources is to be used. The timings for controlling the video cameras and the video recorders are also controlled by the editing apparatus to allow the entire system composed of the video cameras and video recorders to operate in synchronization. This control scheme is also applied to the automatic video editing by the editing apparatus or the manual video editing by means of the editing apparatus.

It should be noted that the example shown in FIG. 1 is related to the editing of video data; in the case of the editing of only audio data, the editing scheme and equipment configuration are the same as those employed in the above-mentioned example.

With the above-mentioned video editing apparatus, it is possible, for example, to edit video and audio data supplied from information sources on a wide-area information communication network in a city or between cities, provide the edited video and audio data as new information on the network to share the information in the wide area, and create images on each editing apparatus according to local requests.

Figure 2:
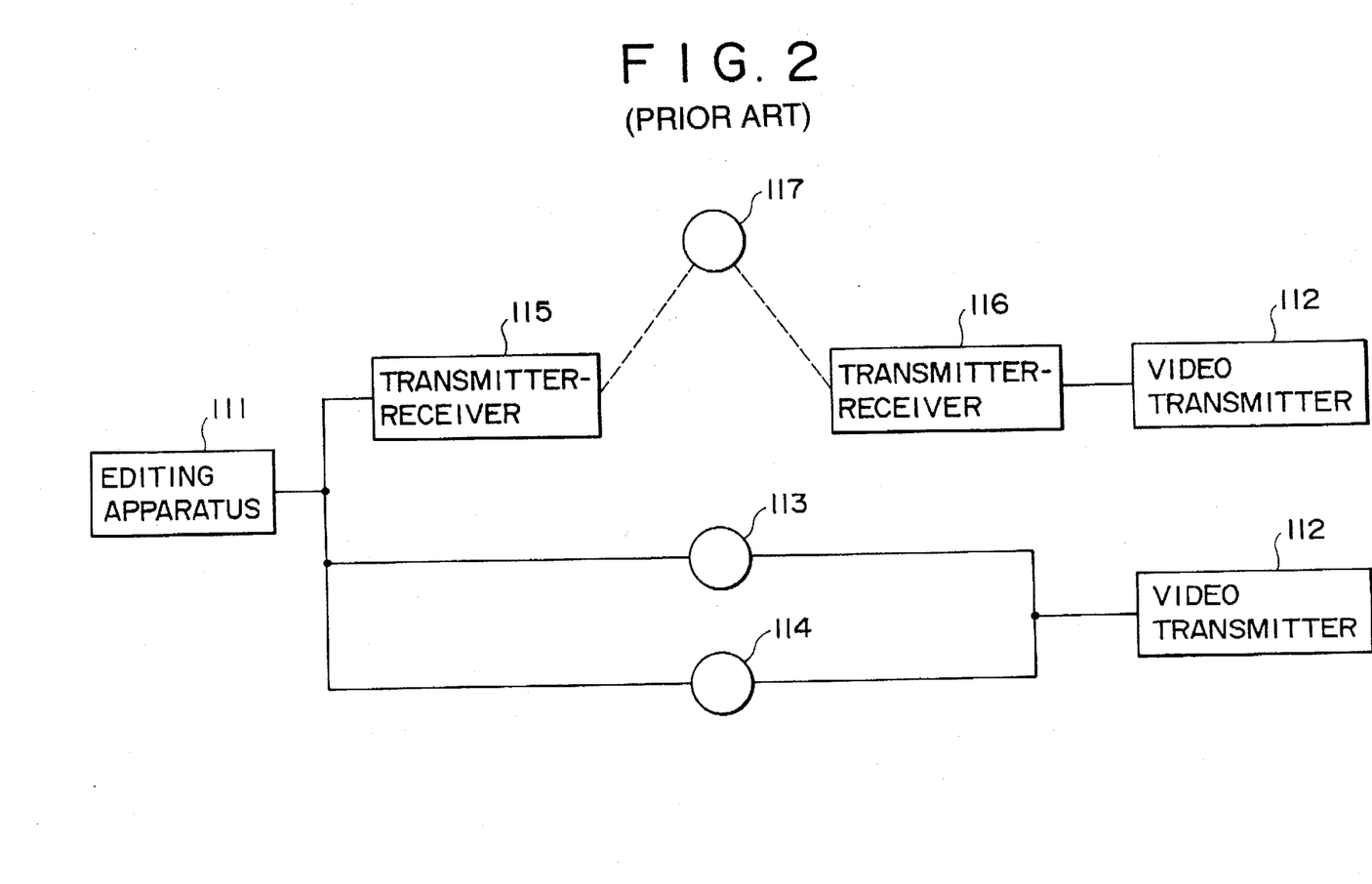
FIG. 2 is a diagram illustrating another example of the constitution of the conventional editing system of FIG. 1.

However, on the above-mentioned wide-area network shown in FIG. 2 for example, it is required to provide a signal repeater 113 or a signal repeater 114 between an editing apparatus 111 and a video transmitter 112. It is not easy to predict or guarantee a response of the video transmitter 112 to a control request by the editing apparatus 111. If the plurality of the signal repeaters 113 and 114 are provided between the editing apparatus 111 and the video transmitter 112 and if different control requests such as starting reproduction and ending reproduction issued from the editing apparatus 111 are transmitted over different communication paths, it is possible that the requests are received by the video transmitter in the reverse order, that is, the end reproduction request may be received before the start reproduction request. Namely, on the above-mentioned network, it is not easy to properly function the synchronous controlling as shown in FIG. 1.

If the editing apparatus 111 and the video transmitter 112 are connected via a satellite communication system composed of transmitter-receiver 115 and 116 and a communication satellite 117 for example, the above-mentioned problem of receiving the control requests in a wrong order becomes more obvious.

If the types of apparatuses connected to a communication system are different, the types of data to be communicated are different or the forms of communication paths are different, it is difficult to predict or guarantee the operations of the entire communication system.

Figure 3:
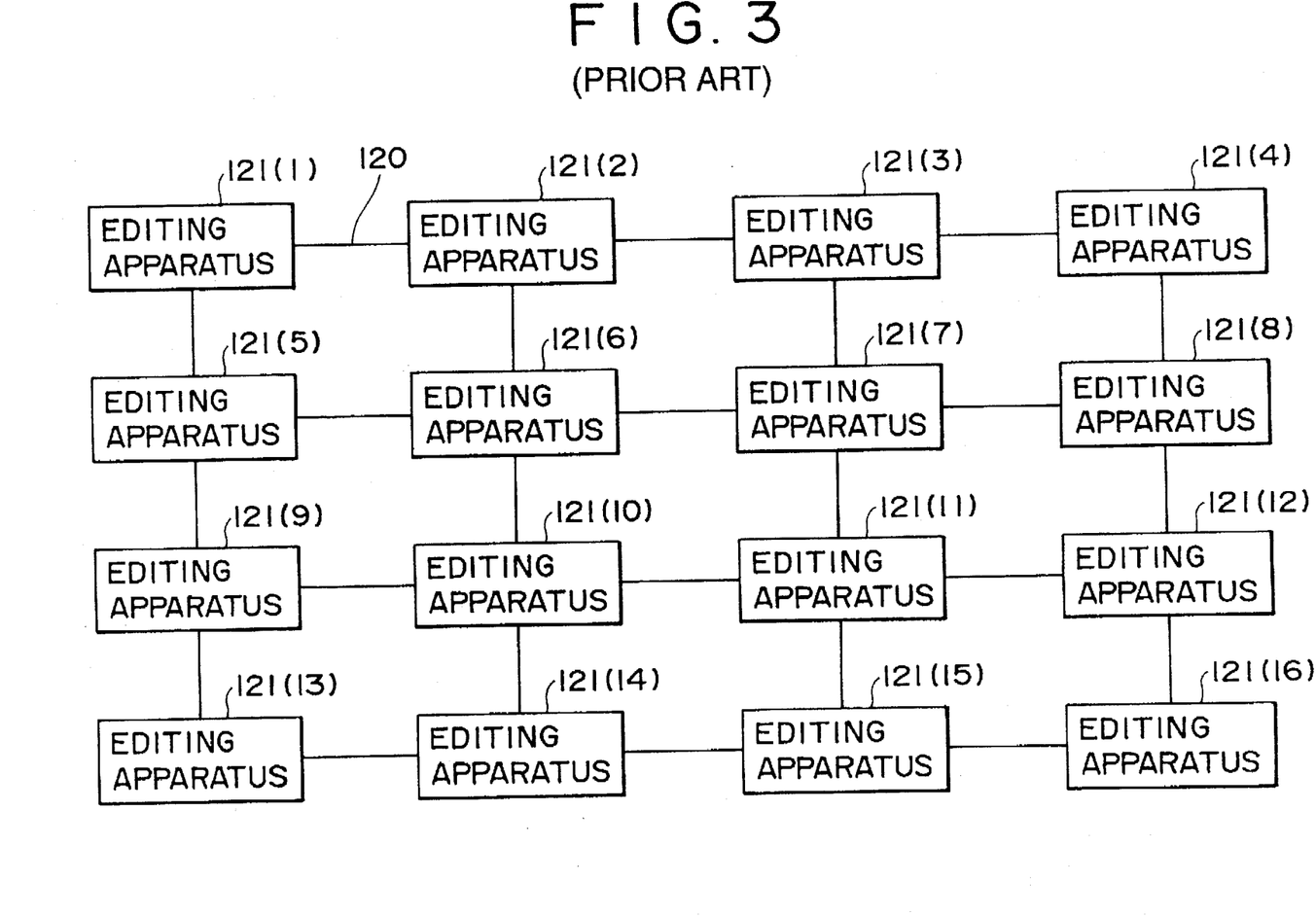
FIG. 3 is a diagram illustrating still another example of the constitution of the conventional editing system of FIG. 1.

If the editing and creation of video and audio data are not performed by a specific apparatus concentratedly but performed by a plurality of editing apparatus 121 (1) through 121 (16) on a network 120 as shown in FIG. 3 in response to local requests of editing apparatuses 121 (i) (i=1 to 16) based on video and audio data supplied from other editing apparatuses (j) (j=1 to 16, j≠i) on the network 120, the above-mentioned problem is also encountered by the editing operation on each of the editing apparatuses 121 (i), thereby making it difficult for the synchronous controlling to function properly.

It should be noted that the above-mentioned editing apparatuses 121 (i) may either be apparatuses representing specific organizations such as broadcasting stations and video studios or household video recording and editing apparatuses. Also, the editing apparatuses 121 (i) may be different in type. The network 120 may be a private network, a cable television network or a communication network between broadcasting stations. Further, the network 120 may be an interconnection network as introduced in "A Survey of Interconnection Networks," Tse-yun Feng, Computer, pp. 12–27, December 1981, or a network based on the combination of the interconnection network and any of the above-mentioned networks.

SUMMARY OF THE INVENTION

It is therefore an object of the present invention to provide an information signal editing apparatus which overcomes one or more of the above-mentioned problems.

It is a further object of the present invention to provide an information editing system which overcomes one or more of the above-mentioned problems.

In carrying out the invention and according to one aspect thereof, there is provided an information signal editing apparatus in which a plurality of information signals having synchronization information are asynchronously entered and which edits at least one of the plurality of information signals entered. The editing apparatus includes a synchronization information detecting section and an editing section. The synchronization information detecting section detects the synchronization information included in the information signals entered. The editing section performs editing processing on at least one of the entered plurality of information signals based on the synchronization information detected by the detecting section.

In carrying out the invention and according to another aspect thereof, there is provided an information signal editing system including a plurality of editing apparatuses and a communication network. Each of the plurality of editing apparatuses edits at least one of a plurality of information signals entered asynchronously, each of the plurality of information signals having synchronization information. Each of the plurality of editing apparatuses has a synchronization information detecting section for detecting the synchronization information contained in the information signals entered and an editing section for performing editing processing on at least one of the plurality of entered information signals based on the synchronization information detected by the detecting section. The communication network interconnects the plurality of editing apparatuses and transfers the information signals therebetween.

As mentioned above and according to the present invention, the editing section for performing information signal editing edits the plurality of information signals based on the synchronization information detected by the synchronization information detecting section, so that the editing of the plurality of information signals need not provide synchronization therebetween, realizing real-time editing.

The above and other objects, features and advantages of the present invention will become more apparent from the accompanying drawings, in which like reference numerals are used to identify the same or similar parts in several views.

DESCRIPTION OF THE PREFERRED EMBODIMENTS

The information editing apparatus and system associated with the present invention will be described in further detail by way of example with reference to the accompanying drawings.

The following preferred embodiment of the invention will be described by using, for example, an editing system for processing and editing video and audio information. In the editing system, from video or audio information supplied from a plurality of video or audio editing apparatuses interconnected by a network, new video or audio information is created by means of video or audio information controllers interconnected by the network, the controller serving as other editing apparatuses.

It should be noted that, in the following description of the preferred embodiment, the term "audio" is regarded as meaning one of the information forms in which video is represented and therefore audio information will not be referred to solely but will be handled as video information.

Figure 4:
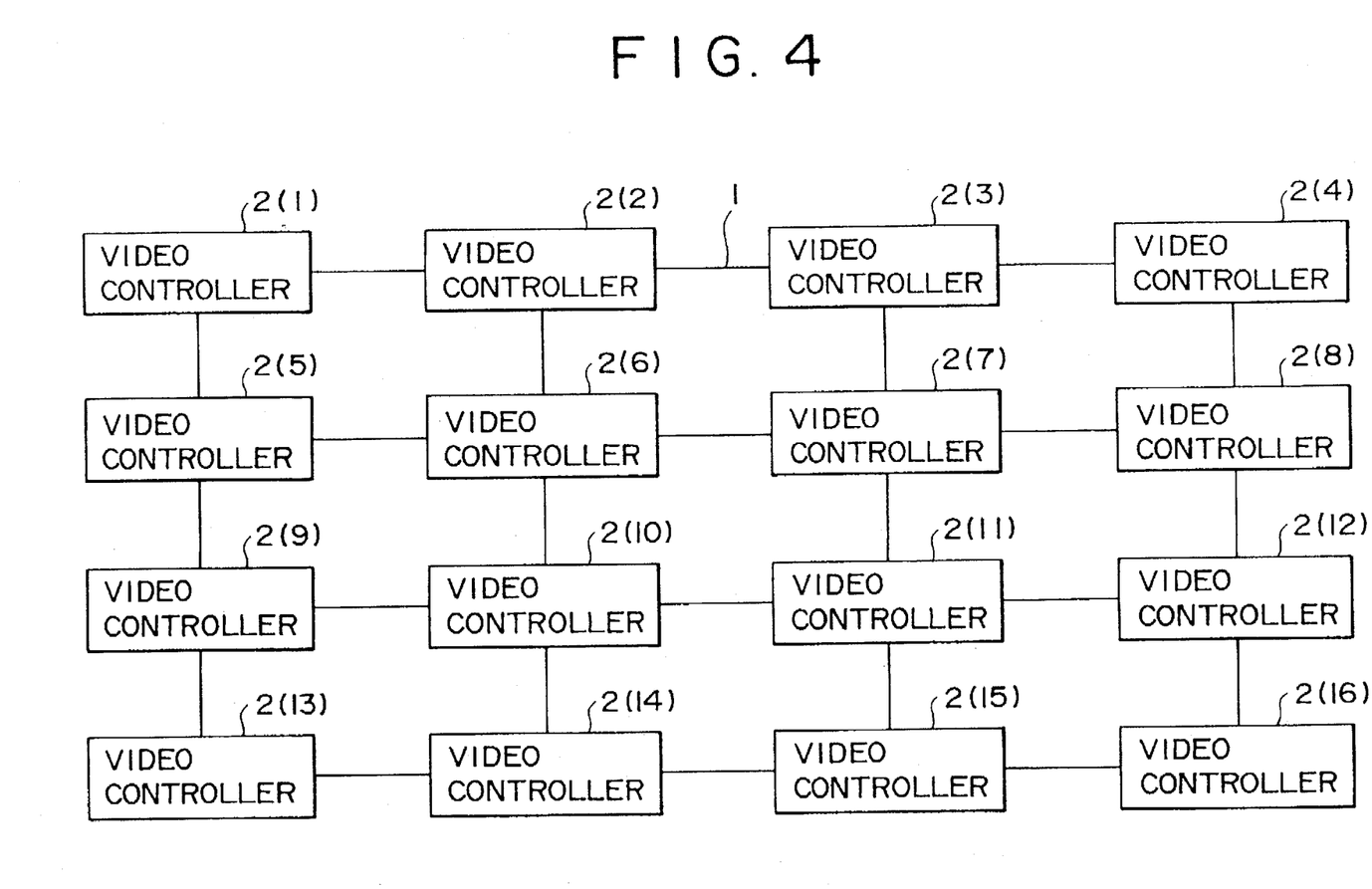
FIG. 4 is a diagram illustrating a constitution of one preferred embodiment of the editing system according to the invention.

Referring to FIG. 4, the video and audio information editing system associated with the preferred embodiment of the present invention realizes video information editing real-time by creating, from a plurality of video information pieces supplied from a plurality of video controllers 2 (1) through 2 (16) interconnected by a network 1, new video information at video controllers (i) (i=1 to 16) and supplying the newly created video information to other video controllers (j) (j=1 to 16, j≠i) on the network 1. In the network 1 associated with the present embodiment, the video controllers 2 (1) are interconnected in a matrix.

It should be noted that, in addition to the above-mentioned matrix network, the network 1 may be a cable television communication network having bidirectional communication capability, a communication network between broadcasting stations, an interconnection network introduced in "A Survey of Interconnection Networks," Tse-yun Feng, pp. 12–27, December 1981, or a network constructed by combining any of above-mentioned networks.

On the above-mentioned networks, communication may be made synchronously as practiced conventionally. In the present embodiment, however, information is asynchronously transferred between the video controllers. In any form of network, a message sent from a given video controller, that is, information and communication data indicating a way of handling the information, namely synchronization information, is assured to reach its destination, or another video controller. However, if there are two or more communication paths between a sending video controller and a receiving video controller, messages are not necessarily received in the order in which they have been sent; that is, there is a possibility that a message sent later is received before a message sent earlier.

In the video controllers 2 (i) of the present embodiment, one video controller receives video information sent from other video controllers on the network 1 asynchronously, that is, without performing synchronizing operation. The receiving video controller (i) edits the received video information to create new video information and sends the created new video information over the network 1 to, e.g., another video controller. Another video controller that has received the newly created video information edits the received video information in a similar manner. The editing operations of the video controllers are processed real-time.

The video information transferred on the network 1 is attached, for example, with time information for specifying a time to be used in editing. Based on the received time information, an editing apparatus that has received and edited such information adds similar time information to the newly edited information, and the resultant video information is sent to another video controller.

The time information attached to the video information is used for editing processing and may be different from a time at which an actual editing operation is performed. Consequently, there is no problem if a time delay caused by communication occurs in the video information. If the edited and created video information is used for broadcasting for example, the video information is actually broadcast according to the attached time information.

If time delays caused by communication are accumulated in the received video information or an editing operation executing time exceeds a predetermined limit, the executing time is shortened by lowering the accuracy of arithmetic operation or the number of frames of the video information to be transmitted, thus realizing real-time editing.

If the plurality of video controllers 2 (*i*) on the network 1 are performing interactive processing, that is, performing mutual communication in which one of the video controllers receives video information from another video controller and then sends the edited information to that video controller, and if each editing apparatus is performing video information editing processing based on the interactive processing, the video information communicated is attached with information for indicating the mutual positional relationship of the interacting apparatuses to be used for editing.

If a time difference occurs in the video information to be edited due to the time delay caused by communication, thereby making the video information discontinuous or overlapped, the editing processing may be performed according to the relative positional information attached to the video information.

In the above-mentioned editing system, the synchronization information is recognized and the editing processing is performed according to the type and contents of the communicated video information, the types of the editing apparatuses and the types of the video information to be communicated may differ from each other without causing any problem.

Further, each of the video controllers 2 (*i*) need not be a specific editing apparatus; the editing processing or editing operation may be performed on any apparatus connected to the network 1.

The video information editing processing on the above-mentioned editing system is performed in the same manner regardless whether the information to be edited is video or audio.

In the above-mentioned editing system, new video information may be created by performing editing processing on video information asynchronously communicated between apparatuses on a wide-area network through recognition of synchronizing information contained in the video information without using the conventional synchronizing control.

In what follows, a constitution and function of the video controller serving as the editing apparatus used in the above-mentioned editing system will be described in detail.

Figure 5:
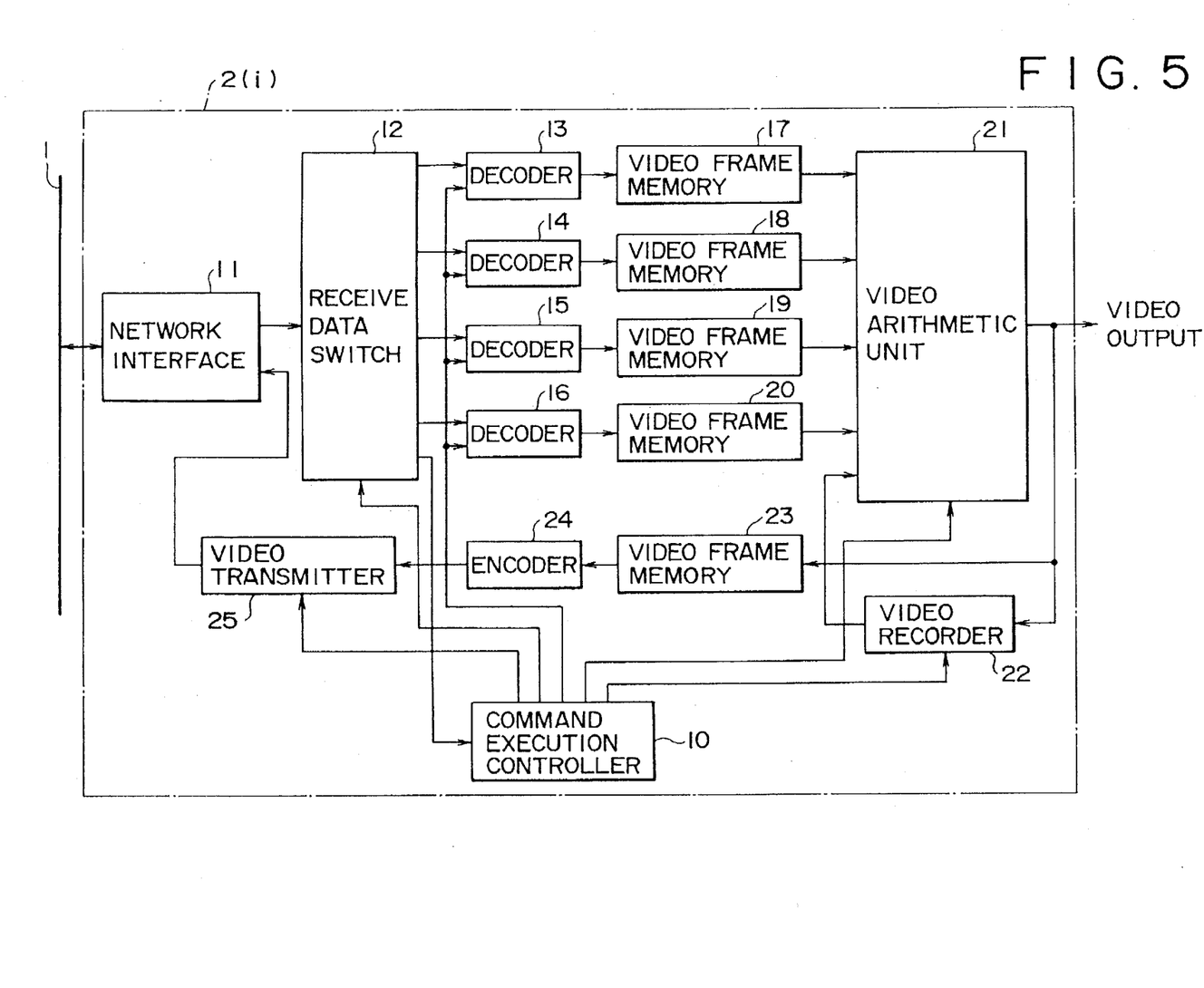
FIG. 5 is a block diagram illustrating a constitution of the video controller of FIG. 4.

Referring to FIG. 5, the video controller 2 (*i*) has a command execution controller 10, a network interface 11, a receive data switch 12, decoders 13 through 16, video frame memories 17 through 20, video arithmetic unit 21, a video recorder 22, a video frame memory 23, an encoder 24, and a video transmitter 25.

The command execution controller 10 executes an editing command entered from outside or via the network interface 11 and monitors and controls editing processing.

The network interface 11 processes the communication with the network 1. The receive data switch 12 receives a message via the network interface 11 and supplies data to the parallel connected decoders 13 through 16 according to the contents of the received message. The decoders 13 through 16, if the video information received by the receive data switch 12 is encoded, decode the encoded information. The video data decoded by the decoders 13 through 16 is temporarily held in the video frame memories 17 through 20 which are connected to the outputs, respectively, of the decoders 13 through 16. The video arithmetic unit 21 edits and creates new data from a plurality of pieces of data read from the video frame memories 17 through 20. The video recorder 22 records the data edited and created by the video arithmetic unit 21. The video data recorded in the video recorder 22 is used for later editing processing by the video arithmetic unit 21. The video frame memory 23 temporarily holds the video data edited and created by the video arithmetic unit 21. The encoder 24 encodes the video data stored in the video frame memory 23 if the encoding of the video data is necessary before transmission. The video data outputted from the encoder 24 is transmitted by the video transmitter 25 to the network 1 via the network interface 11.

When the video controller 2 (*i*) has received video information based on the control of the command execution controller 10, the receive data switch 12 checks the decoders 13 through 16 and the video frame memories 17 through 20 for the operating states thereof and supplies the video information to the decoders such that the pairs of the decoders 13 through 16 and the video frame memories 17 through 20 become equal in load. The video controller 2 (*i*) of the present embodiment has four pairs of the decoders 13 through 16 and the video frame memories 17 through 20. The number of pairs is determined by a receive data processing capability; therefore, it may be that many pairs of decoders and video frame memories are employed.

Figure 6:
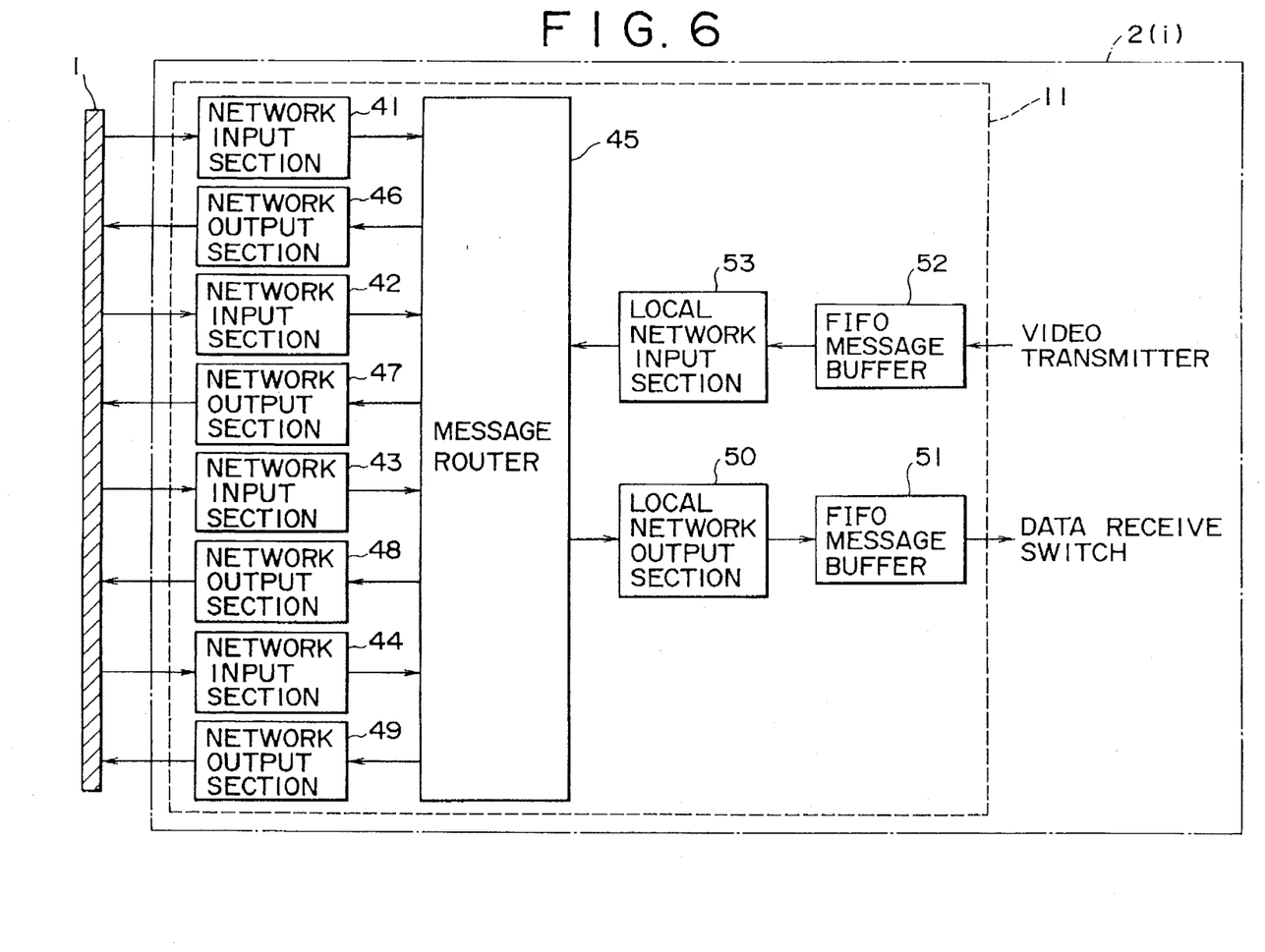
FIG. 6 is a block diagram illustrating a constitution of a network interface of FIG. 5.

Referring to FIG. 6, the network interface 11 is comprised of network input sections 41 through 44, a message router 45, network output sections 46 through 49, a local network output section 50, FIFO message buffers 51 and 52, and a local network input section 53. The network input sections 41 through 44 receive a message from the network 1. The message router 45 routes a communication message supplied from the network input sections 41 through 44 or the local network input section 53. The local network output section 50 outputs the message received from the message router 45 to the receive data switch 12 in the video controller 2 (*i*). The FIFO message buffer 51 holds the message received by the local network output section 50 until the message is processed in the video controller 2 (*i*). The FIFO message buffer 52 temporarily holds the message received from the video transmitter 25 in the video controller 2 (*i*). The local network input section 53 transmits the message held in the FIFO message buffer 52 to the message router 45.

In the constitution of the present embodiment, the network interface 11 of the video controller 2 (*i*) has interface to the network 1, the interface being composed of four pairs of the network input sections 41 through 44 and the network output sections 46 through 49. Depending on a network constitution to be used, interface with another number of pairs may be provided.

A group of the network input sections 41 through 44 and the local network input section 53 and another group of the network output sections 46 through 49 and the local network output section 50 have the same functions for the message router 45 and therefore operate in the same manner.

Having received a message from the network input section 41 to 44 or the local network input section 53, the message router 45 reads data associated with the receiving party from the received message and determines a shortest route in time to a video controller equivalent to the receiving party on the network 1. Based on the result of the determination, the message router 45 sends the message to the video controller connected to the other end of the shortest route at the network output section 46 to 49 or the local network output section 50 thereof. The message is sent on a packet basis.

If the network output sections 46 through 49 or the local network output section 50 of the video controller to which the message is to be sent is busy, the message router 45 determines how long the busy time continues and, if there is a next shortest route in time to the receiving party, sends the message to the network output section of the video controller connected to this route.

It should be noted that, depending on the form of the network 1, if the distance between the video controllers is relatively long for example, provision of a message repeater is necessary on the network. The message repeater in this case may be constituted by including the message router 45, the network input section 41 to 44, and the network output section 46 to 49 shown in FIG. 6.

Figure 7:
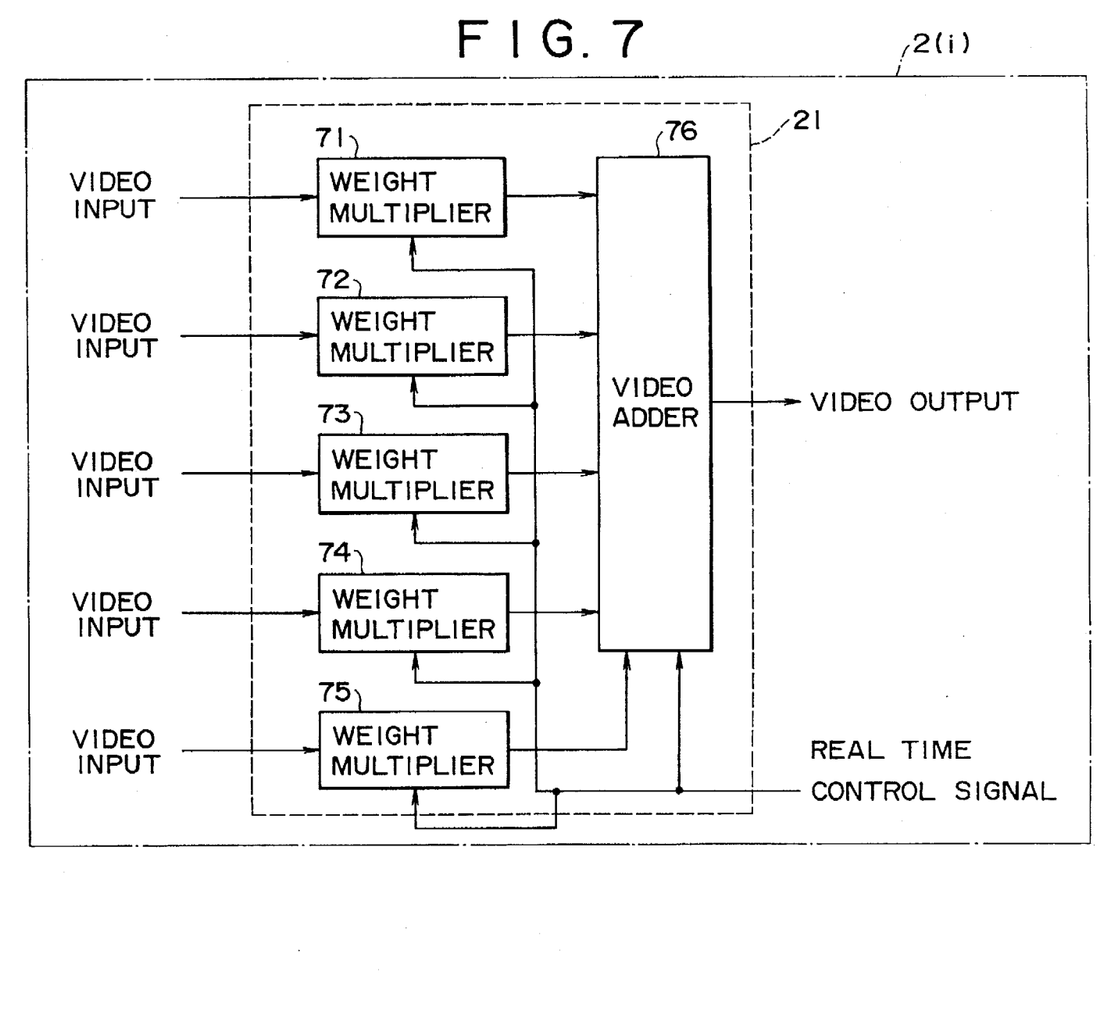
FIG. 7 is a block diagram illustrating a constitution of a video arithmetic unit of FIG. 5.

Referring to FIG. 7, the video arithmetic unit 21 has weighing multipliers 71 through 74 for weighting the video input coming from the video frame memories 17 through 20, a weighting multiplier 75 for weighting the video input coming from the video recorder 22, and a video adder 76 for performing an arithmetic operation for superimposing a plurality of images coming from the multipliers 71 through 75.

Figure 8:
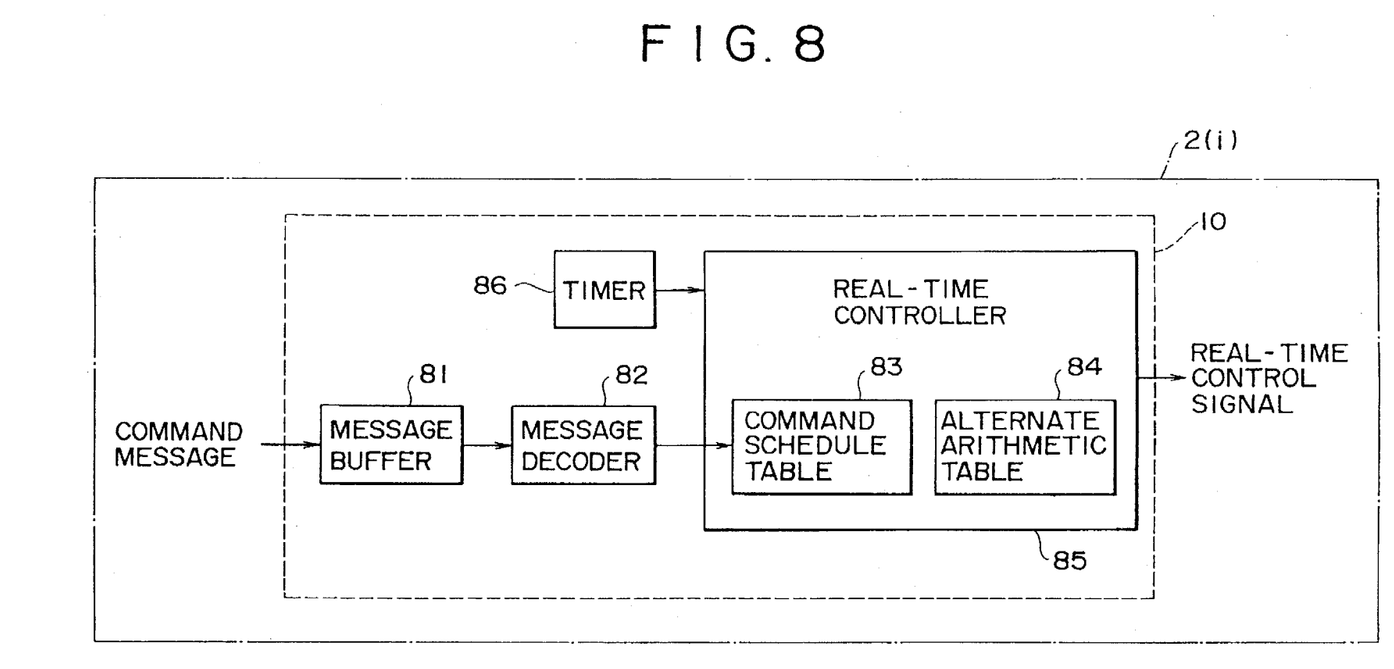
FIG. 8 is a block diagram illustrating a constitution of a command execution controller of FIG. 5.

Referring to FIG. 8, the command execution controller 10 has a message buffer 81 for temporarily holding a command message entered from the receive data switch 12, a message decoder 82 for decoding the command message held in the message buffer 81, a real-time controller 85 containing a command schedule table 83 for holding the command decoded by the message decoder 82 until the command is executed and an alternate arithmetic table 84 for controlling arithmetic processing that can be replaced in the command, and a timer 86 for making the real-time controller 85 recognize a real time.

In the real-time controller 85, the command held in the command schedule table 83 may be rewritten with another command by referencing the alternate arithmetic table 84.

Table 1 lists the contents of the command schedule table.

TABLE 1

Command Schedule

| Command | Data time | Execution time limit | Execution state |
|---|---|---|---|
| Composite video 91 (decoding scheme A) with video 92 (decoding scheme A) by video superimposing scheme A. | 7 h, 21 min, 30.000 s | 7 h, 21 min, 33.210 s | In execution |
| Stop sending video 95 to video controller. | 7 h, 35 min, 45.000 s | T | In wait |
| Connect video 93 (decoding scheme A) with video 94 (decoding scheme A). | NIL | NIL | In execution |
| ... | ... | ... | ... |

As shown in Table 1, the command schedule table 83 is composed with a command field for holding commands indicated by a received message, the data time field for holding a data time in which data is handled in a real time, the execution time limit field for indicating a time limit for the execution of the command, and the execution state field for indicating the execution state of the command.

The data time is added to the received message as necessary. The execution time limit is determined by a kind of a real-time processing to be executed and is added to the received message.

Based on the result of comparison between arithmetic execution time and execution limit time, the commands are controlled in the command schedule table in an order urgency in execution time. A command not indicated with an execution time limit is put at a lower position in the order. A command indicated with a data time is indirectly determined for an execution time limit as described below, so that the command is handled in the similar manner as a command indicated with an execution time limit.

The example of Table 1 indicates the editing of an image to composite an image by superimposing the video data decoded from received video information 91 by decoding scheme A with the video data decoded from received video information 92 by decoding scheme A, the editing operation to be performed by 7 h., 21 min., 33.210 sec, an absolute time.

It should be noted that the execution limit time may be an absolute time as shown in Table 1 or a time relative to data provided as a reference.

The above-mentioned example of Table 1 also indicates that the video data based on video information 93 decoded by decoding scheme A is followed by the video data based on the video information 94 decoded by decoding scheme A. The symbol "NIL" indicated in the execution time limit field indicates that the video information 93 and the following video information 94 are specified with no execution limit time. In the case of the above-mentioned editing operation, if the video information 93 and the video information 94 are received overlapped in time or there is an interruption in reception therebetween, the time difference is automatically adjusted for alignment. In this editing, no data time is specified; instead, the symbol "NIL" is used.

If real-time processing is not performed or if there is no time limit for command execution, no execution time limit is indicated. In this case, the symbol "NIL" is indicated in the execution time limit field.

If interactive processing involving the communication of video information is performed between two or more video controllers 2 (i), generally a response to a particular communication may not be obtained instantly or, if there are two or more responses to a particular communication, the responses may not be continuous or may be overlapped in time due to the delay in transmission paths. In such a case, correct editing may also be performed on two or more pieces of video information by previously specifying the relative positioning or data times of these pieces of video information.

Table 1 further lists the command for stopping the transmission of the video information 95 being transmitted to the video controller 2(j). In this example, a message holding the command for specifying the video information 95 has not arrived from any video controller 2 (i). Therefore, the execution is in the wait state.

The execution wait state is caused, as described before, when a preceding message is overtaken by a subsequent message on the network. The execution wait state is cleared when a message holding a command for creating the video information 95 has been received and the command has been executed.

In the above-mentioned case, a data time in which data is processed in a real time is specified in each command, so that an arithmetic operation is performed according to the data time, resulting in the correct editing of the video information.

For the commands listed in Table 1, no execution limit time is explicitly indicated in the commands, but the data time accompanying the data must be kept as the time for processing the data. When executing a command based on the data time, symbol "T" is indicated in the execution time limit field. Each command attached with symbol "T" in the execution time limit field need not strictly observe the data time as the execution time limit. If the data time exceeds a real time, the real-time processing can be performed on another video editing apparatus that has also received that data. The editing of video information according to messages asynchronously communicated on the network 1 can be correctly functioned by making the above-mentioned control.

Table 2 lists the contents of the alternate arithmetic table 84.

TABLE 2

Alternate Arithmetic

| Arithmetic | Arithmetic time | Alternate arithmetic | Arithmetic time | Shortened time |
|---|---|---|---|---|
| Decoding scheme A | 250 ms | Decoding scheme B | 150 ms | 100 ms |
| Video super-imposing scheme A | 75 ms | Video super-imposing scheme B | 35 ms | 40 ms |
| ... | ... | ... | ... | ... |
| Frame transmission | 15 ms | NIL | 0 ms | 15 ms |
| ... | ... | ... | ... | ... |

The alternate arithmetic table 84 manages, among the arithmetic operations in the commands listed in the command schedule table 83, those arithmetic operations which can be replaced with ones having short arithmetic times to keep execution time limits.

As shown in Table 2, the alternate arithmetic table has the arithmetic field indicating an arithmetic that can be replaced with another arithmetic, the arithmetic time field indicating an execution time of the arithmetic operation in the arithmetic filed, the alternate arithmetic field indicating an alternate arithmetic, the arithmetic time field indicating an execution time of the alternate arithmetic, and the shortened time field indicating a time that can be shorted by the alternate arithmetic.

Of the alternate arithmetic operations, those which stop the execution of arithmetic operation are indicated with symbol "NIL." In the example of Table 2, replacing decoding scheme A with decoding scheme B shortens an arithmetic time by 100 milliseconds and replacing superimposing scheme A with superimposing scheme B shortens an arithmetic operation by 40 milliseconds. Further, in the example of Table 2, by stopping the transmission of a video frame, or by using an immediately preceding video frame in creating video information or video data, an arithmetic operation is shortened by 15 milliseconds.

The arithmetic replacement is controlled in the alternate arithmetic table 84 in the order of replacement priority.

Of the commands listed in the command schedule table, a command that it is possible not to keep its execution limit time is replaced with a command having a shorter execution time according to the alternate arithmetic table 84. In this case, arithmetic operations may be replaced in a same command.

The following describes a method of real-time executing commands contained in messages communicated asynchronously and commands indicated with execution limit times in each video controller 2 (i).

In the video controller 2 (i), receiving a message from the network 1 via the network interface 11 as shown in FIG. 5, the receive data switch 12 sends video data contained in the received message to the decoder 13 to 16 and a command contained in the received message to the command execution controller 10.

In the command execution controller 10, the command sent from the receive data switch 12 is temporarily held in the message buffer 81 as shown in FIG. 8. The message decoder 82 decodes the command held in the message buffer 81 to register the command in the command schedule table 83 in the order of the urgency of execution time as described before.

The real-time controller 85 manages and controls the execution of the command registered in the command schedule table 83 by use of the alternate arithmetic table 84 and instructs each functional portion of the video editing apparatus 2 (i) of FIG. 5 to execute the arithmetic operation specified by the command.

Figure 9:
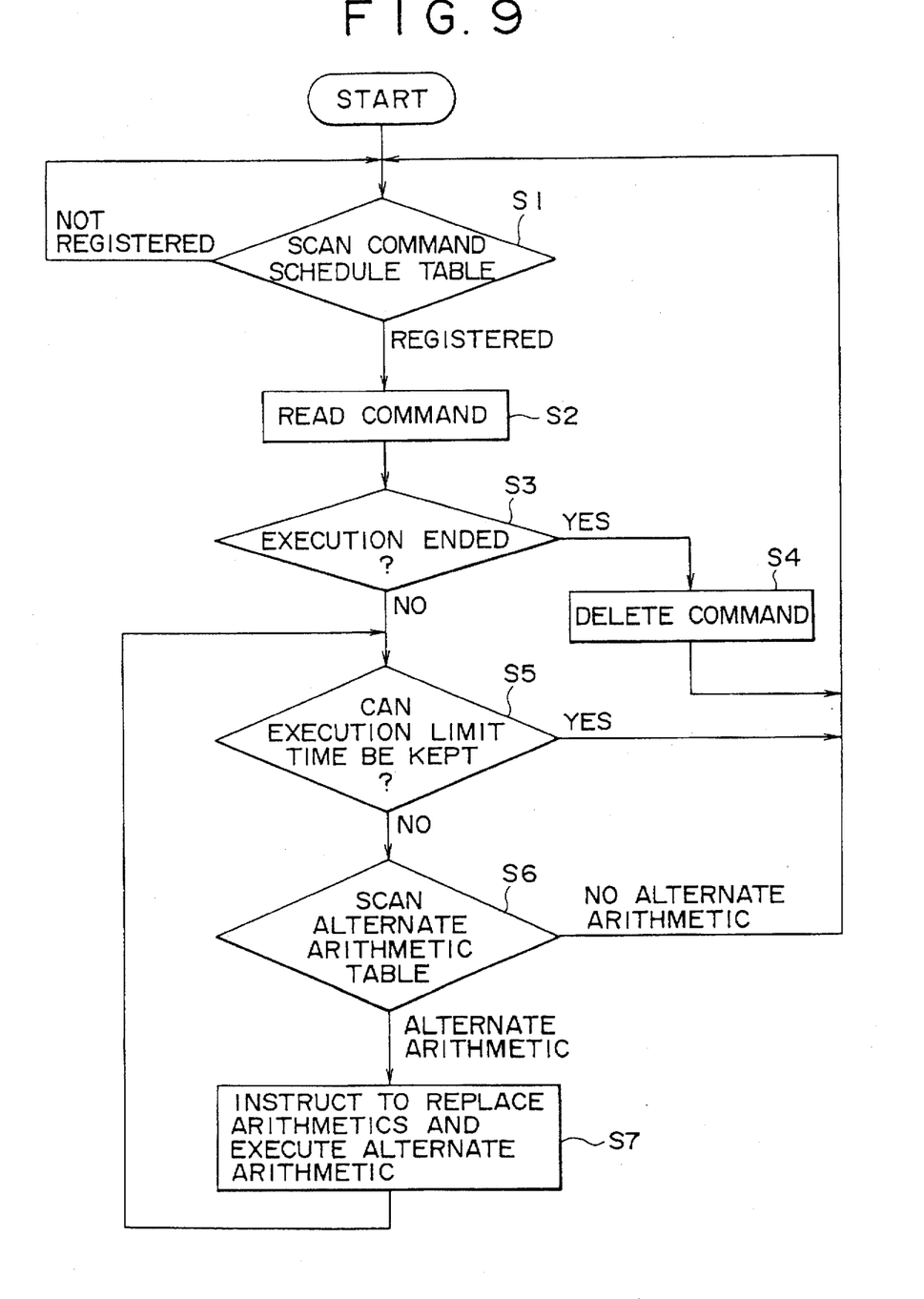
FIG. 9 is a flowchart describing the operations of the command execution controller of FIG. 8.

At this moment, the real-time controller 85 is operating according to an operational flow indicated by the chart of FIG. 9.

That is, referring to FIG. 9, the real-time controller 85 scans the command schedule table 83 in step S1. If commands are found registered, by the message decoder 82, in the command schedule table 83, the real-time controller 85 reads the commands in the order of the registration in step S2 and then goes to step S3. If no command is found registered in the command schedule table 83 as the result of the scan in step S1, the real-time controller 85 is kept in the wait state until a registered command is received, or a command is registered in the command schedule table 83 and read from the command schedule table 83.

In step S3, the real-time controller 85 determines whether the command read from the command schedule table 83 has already been executed. If the command has been found executed, the real-time controller 85 deletes the command from the command schedule table 83 in step S4 and goes back to step S1.

If the command read from the command schedule table 83 is found not already executed, the real-time controller 85 reads the internal states of the functional portions, or the components of the video controller 2 (i), grasps the execution state of the command, and determines whether the execution time limit of the command can be kept or the data time is passing along with the real time in step S5.

If the real-time controller 85 determines that the command can be executed within the real time, the real-time controller goes back to step S1 to scan the command schedule table 83 for a next command. If the real-time controller 85 determines that the execution limit time cannot be kept, the real-time controller 85 goes to step S6 to scan the alternate arithmetic table 84. If no alternate arithmetic is found, the real-time controller 85 goes back to step S1 to scan the command schedule table 83 for a next command. If an alternate arithmetic is found, the real-time controller 85 replaces those arithmetic operations of the command which have not been executed with arithmetic operations having shorter execution times and instructs the above-mentioned components or functional portions to perform the replacement and the execution of the arithmetic operations having shorter execution times in step S7.

The replacement of the arithmetic operations is repeated until the real-time controller 85 determines that the execution limit time can be kept with reference to the alternate arithmetic table 84. Even if the execution limit time exceeds the real time, the real-time controller 85 generally determines that the execution limit time can be kept if the excess time falls in a predetermined allowable range, for example 100 milliseconds.

If the execution limit time cannot be kept by the replacement of arithmetic operations, the video information transmitted on the network 1 is used by another video controller, and the real-time controller 85 determines that the final execution limit time can be kept by the real-time processing by that video controller, the real-time controller 85 performs the replacement of arithmetic operations based on the alternate arithmetic table 84.

If the created video information is used real-time for broadcasting or the like, the reproduced images are subject to undesired effects such as disturbance. Generally, however, the entire video controller is provided with enough processing capability for preventing such undesired effects from occurring. If a delay is about several hundred milliseconds from the real time, such a delay can often be absorbed in video controllers at the subsequent stage.

The edited and created video information is attached with the data time of the video information from which the edited and created video information has been edited and created, the data time set according to the execution limit time of the editing, and a command for further editing the edited and created video information to be sent to a video controller specified by the command.

Thus, the editing work of the entire system consisting of the video controllers 2 (*i*) connected to the network 1 progresses based on the message propagation in the system.

For example, in the video controller 2 (10) of FIG. 4, to reproduce video information stored in the video controller 2 (2) and video controller 2 (12), edit the reproduced video information by using the video arithmetic capability of the video controller 2 (5), and superimpose the video information edited and created by the video controller 2 (5) with video information being transmitted real-time from the video controller 2 (14) to create new video information, the message is transmitted from the video controller 2 (10) to the video controller 2 (2) and the video controller 2 (12); from the video controller 2 (2) to the video controller 2 (5) and from the video controller 2 (12) to the video controller 2 (5); from the video controller 2 (5) to the video controller 2 (10); from the video controller 2 (10) to the video controller 2 (14); and from the video controller 2 (14) to the video controller 2 (10), thereby providing the commands necessary for the processing.

As mentioned above and according to the editing system of the present embodiment, the communication such as the request for video transmission and the response thereto between the video controllers 2 (*i*) need not be performed synchronously. On the contrary, each of the video controllers receives one piece of communication data, recognizes synchronization information from the received communication data, and edits the video and audio information based on the recognized synchronization information to create new video and audio information. Consequently, video and audio information can be asynchronously received from two or more video controllers connected to the network 1 to edit the received video and audio information real-time on one video controller connected to the network 1.

It should be noted that, if one video controller 2 (*i*) does not know the editing capabilities of other video controllers 2 (*i*) on the network 1 beforehand and if it is necessary to get a particular piece of video information from the network 1 for example, that video controller can broadcast a message to all the other video controllers to retrieve the desired video information from the video controllers having the desired video information.

If each of the video controllers 2 (*i*) is assigned with a particular editing capability beforehand, the received video information can be processed according to the assigned editing capability, thereby performing the editing work of the system as a whole.

It should also be noted that, although the above description has been made mainly with respect to the editing of video information, the present invention is applicable to the editing of audio information as well.

In addition, the above-mentioned editing system is applicable to a network connected with different types of video controllers or to combinations of different types of networks.

While the preferred embodiments of the present invention have been described using specific terms, such description is for illustrative purposes only, and it is to be understood that changes and variations may be made without departing from the spirit or scope of the appended claims.

What is claimed is:

1. An information signal editing apparatus in which a plurality of information signals having synchronization information are entered asynchronously and which edits at least one of the plurality of entered information signals, comprising:

synchronization signal detecting means for detecting said synchronization information from said plurality of entered information signals;

editing means for performing editing processing on at least one of said plurality of entered information signals based on said synchronization information detected by said synchronization information detecting means;

wherein said synchronization information detecting means controls the editing processing of said editing means based on time information included in said synchronization information for use in the editing processing and has control means for determining whether said editing processing is completed within a processing time specified based on said time information; and wherein said control means generates a control signal for making said editing means perform alternate arithmetic processing if said control means determines that said editing processing is not completed within the specified processing time.

2. An information signal editing apparatus in which a plurality of information signals having synchronization information are entered asynchronously and which edits at least one of the plurality of entered information signals, comprising:

synchronization signal detecting means for detecting said synchronization information from said plurality of entered information signals;

editing means for performing editing processing on at least one of said plurality of entered information signals based on said synchronization information detected by said synchronization information detecting means;

a plurality of decoding means for decoding said plurality of entered information signals and supplying decoded data to said editing means; and selecting means for supplying data to said plurality of decoding means such that loads on said plurality of decoding means become equal to each other.

3. An information signal editing system comprising:

a plurality of editing apparatuses into which a plurality of information signals having synchronization information are entered asynchronously and which edit at least one of the plurality of entered information signals, each of said plurality of editing apparatuses having synchronization information detecting means for detecting said synchronization information from said plurality of entered information signals and editing means for performing editing processing on at least one of said plurality of entered information signals based on the synchronization information detected by said synchronization information detecting means; and a network for interconnecting said plurality of editing apparatuses and transferring the information signals therebetween.

4. An information signal editing system according to claim 3, wherein each of said plurality of editing apparatuses has input/output means for performing input/output of data with others of said plurality of editing apparatuses via said network, said input/output means outputting the information signal to the others of said plurality of editing apparatuses along the shortest routes determined by said input/output means.

5. An information signal editing system according to claim 4, wherein each of said plurality of editing apparatuses further has transmitting means for transmitting the information signal edited by said editing means via said input/output means.

6. An information signal editing system according to claim 3, wherein said synchronization information detecting means controls the editing processing of said editing means based on relative positional information contained in said synchronization information.

7. An information signal editing system according to claim 3, wherein said synchronization information detecting means controls the editing processing of said editing means based on time information contained in said synchronization information for use in the editing processing.

8. An information signal editing system according to claim 7, wherein said synchronization information detecting means has control means for determining whether or not the editing processing by said editing means is completed within a processing time specified based on said time information.

9. An information signal editing system according to claim 8, wherein said control means has an alternate arithmetic table and, if said control means determines that said editing processing is not completed within the specified processing time, makes said editing means perform alternate arithmetic processing based on said alternate arithmetic table.

10. An information signal editing system according to claim 3, wherein each of said plurality of editing apparatuses has:

a plurality of decoding means for decoding said plurality of entered information signals and supplying decoded data to said editing means; and selecting means for supplying data to said plurality of decoding means such that loads on said plurality of decoding means become equal to each other.

11. An information signal editing system according to claim 3, wherein each of said plurality of editing apparatuses has a holding means for holding the information signal edited by said editing means.

12. An information signal editing system according to claim 3, wherein said network has a bidirectional communication capability.

* * * * *